US008005239B2

(12) United States Patent
Samadani

(10) Patent No.: US 8,005,239 B2
(45) Date of Patent: Aug. 23, 2011

(54) AUDIO NOISE REDUCTION

(75) Inventor: Ramin Samadani, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1330 days.

(21) Appl. No.: 11/589,446

(22) Filed: Oct. 30, 2006

(65) Prior Publication Data

US 2008/0101626 A1 May 1, 2008

(51) Int. Cl.
*H04B 15/00* (2006.01)

(52) U.S. Cl. .......................................... 381/94.3; 700/94

(58) Field of Classification Search .................. 381/1-4, 381/13, 71.1, 71.6, 317, 321, 103, 104, 106, 381/22, 23, 94, 98; 700/94
See application file for complete search history.

(56) References Cited

U.S. PATENT DOCUMENTS

| | | | | |
|---|---|---|---|---|
| 6,185,298 | B1 * | 2/2001 | Hashimoto | 379/390.01 |
| 2005/0111683 | A1 * | 5/2005 | Chabries et al. | 381/317 |
| 2006/0098827 | A1 * | 5/2006 | Paddock et al. | 381/106 |

* cited by examiner

*Primary Examiner* — Xu Mei
*Assistant Examiner* — Lun-See Lao

(57) ABSTRACT

A method for reducing audio noise in an audio signal acquisition is described herein. The method includes: receiving an input audio signal; separating the input audio signal into a high-frequency portion and a low-frequency portion based on a threshold frequency; synthesizing the low-frequency portion to at least reduce any audio noise therein to generate a new low-frequency portion; combining the high-frequency portion and the new low-frequency portion to form a new audio signal representing the input audio signal; and outputting the new audio signal for the audio signal acquisition.

19 Claims, 4 Drawing Sheets

200

AUDIO NOISE REDUCTION

BACKGROUND

A common problem with recording devices such as camcorders and digital cameras is audio noise contamination of the recorded audio signal. As referred herein, audio noise includes unwanted audio signal, such as wind noise or any other undesired audio noise that is present within a particular range of frequency in an audio signal being acquired or recorded. For example, when a camcorder is used to record an outdoor scene, which frequently has wind noise that may contaminate or distort the desired speech, music, and background waterfall sound that are the subjects of the recording. FIG. 1 illustrates a spectrogram 100 of a recording audio signal that contains wind noise. The spectrogram represents the magnitude of the short-time frequency decomposition of the recorded audio signal, with time on the horizontal axis, and frequency on the vertical axis. The light color represents high energy, and the dark color represents low energy. As illustrated, wind noise 110 is known to occur in the lower frequency regions of the spectrum. Wind noise most frequently occurs in outdoor scenes, which typically have other desired background audio signals as well, such as waterfall or rivers as shown by the natural low frequency background 120. The spectrogram 100 also shows the presence of the desired speech signal 130.

Some prior methods for reducing noise employ high-pass filters, sometimes with adaptive cut-offs. However, these high-pass filtering techniques often leave artifacts at the lower frequencies of the recorded audio signal. Consequently, the playback of the recorded audio signal sounds "hollow" because its low-frequency signal portion, which typically includes certain desired background sound, has been removed along with the noise. Other prior methods for reducing noise employs mechanical screens, such as wind screens, that are placed over audio recording mechanisms, such as microphones, of the recording devices. However, the mechanical screens still let through some of the noise.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Described herein are methods and systems for reducing noise contamination in a recorded audio signal while preserving the natural sound of the desired background signal. Such methods and systems are operable in conjunction with conventional mechanical screens to further enhance the noise reduction. Advantages of the methods and systems described herein include but are not limited to: a) the use of non-real-time audio processing that allows latency to provide better separation of the noise; 2) synthesis of the low-frequency background audio signal, resulting in a natural replacement of such a non-intelligible signal in the recorded audio signal.

System

Figure 2:
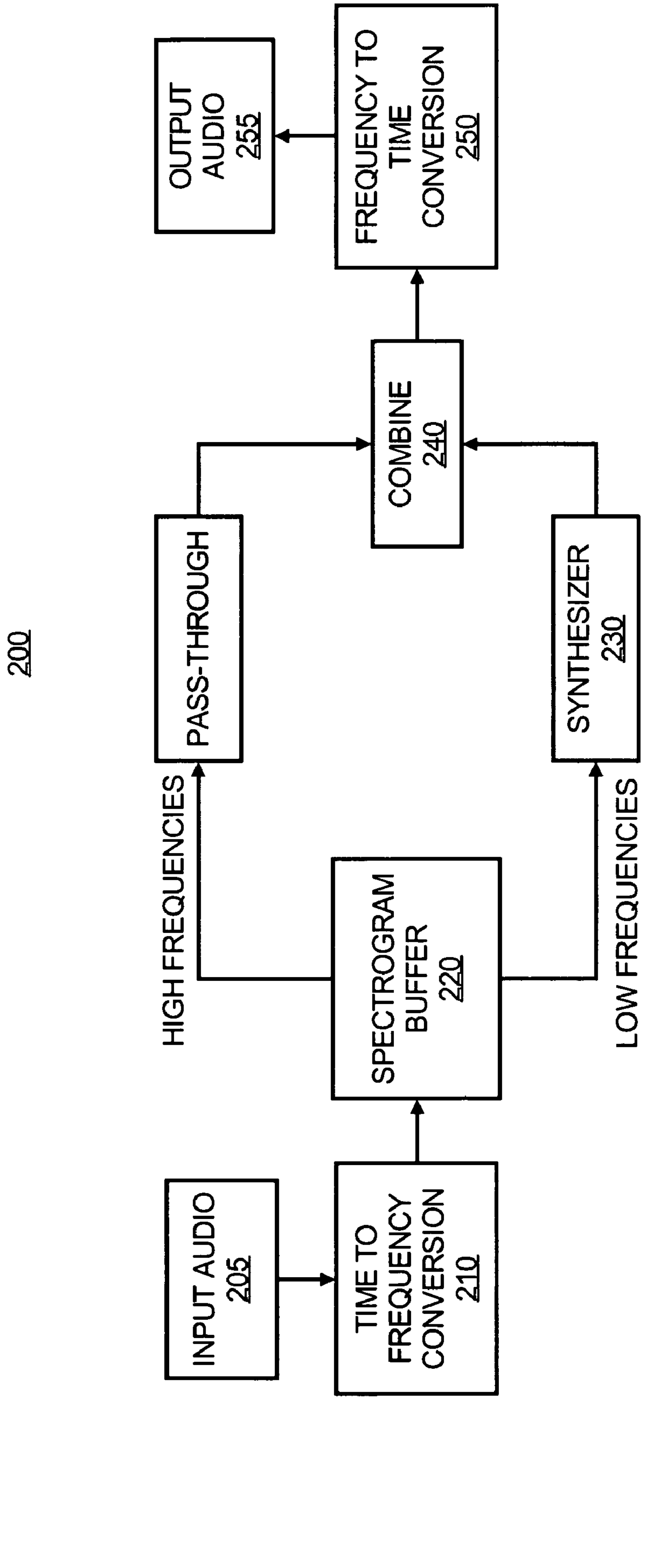
FIG. 2 a high-level block diagram of a noise-reduction system 200, in accordance with one embodiment of the present invention.

FIG. 2 illustrates a high-level block diagram of a noise-reduction system 200, in accordance with one embodiment of the present invention. The system 200 is operable in a recording device, such as a camcorder, a digital camera, or any other device capable of recording audio, so that it can employed to at least reduce audio noise in the recording audio. The system 200 includes a time-to-frequency conversion module 210, a spectrogram buffer module 220, a low-frequency synthesizer 230, a frequency combiner module 240, and a frequency-to-time conversion module 250. The time-to-frequency module 210 is employed to receive and transform (and convert) an input audio signal 205, such as an analog audio signal being recorded by the recording device, into a spectral representation. The time-to-frequency module 210 may optionally include an analog-to-digital converter to discretize or digitize the input analog audio signal 205. Alternatively, the input audio signal 205 is a digital signal, in which case an analog-to-digital converter is not needed. Thus, as referred herein, an audio signal may be an analog or a digital signal representing audio or sound. The spectrogram buffer module 220 is employed as a signal separator and also optionally a storage or memory buffer to store and further separate the spectral representation of the input audio signal into a high-frequency signal portion and a low-frequency signal portion. The crossover or threshold frequency for separating between high and low frequencies may be set as desired, for example, based on prior knowledge of the frequency range of the noise desired to be removed from the input audio signal. In one embodiment, when latency is provided in the audio application (DVD writing in camcorders, digital camera capture, etc.), the spectrogram buffer module 220 is used to store each short segment of the spectrogram prior to its processing and recording.

In one embodiment, while the high-frequency signal portion of each time sample is allowed to pass through without processing, a synthesizer 230 is employed to modify the low-frequency signal portion and generate a new signal portion as a replacement. The frequency combiner module 240 is then employed to recombine the processed low frequencies with the pass-through high frequencies into a combined audio signal. The frequency-to-time conversion module 250 is employed to convert the combined audio signal back into an output audio signal 255 in the time domain, using the phase of the input signal, for recording. The output audio signal 255 may be then be stored in a storage medium of the recording device in which the system 200 is located. For example, the storage medium may be a magnetic tape, an optical disk, or any other storage medium operable to store the recording audio for subsequent playback. Alternatively, the output audio signal 255 may be played back as soon as it becomes available or for any purposes other than storage. Optionally, the frequency-to-time conversion module 250 may further include a digital-to-analog converter to convert any digitized audio signal 255 into an analog signal, should an output analog audio signal is desired for storage, playback, or any other purposes.

In one embodiment, each of the modules in FIG. 2 is potentially implemented by one or more software programs, applications, or modules having computer-executable programs that include code from any suitable computer-programming language, such as C, C++, C##, Java, or the like. Furthermore, the system 200 is potentially implemented by a computerized system, which includes one or more processors of any of a number of computer processors, such as processors from Intel, Motorola, AMD, Cyrix. Each processor also may be an audio processor, a digital signal processor, or any processor dedicated for one or more particular purposes as opposed to a general-purpose processor like the aforementioned computer processor. Each processor is coupled to or includes at least one memory device, such as a computer readable medium (CRM), which also resides in the system 200. The processor is operable to execute computer-executable programs instructions stored in the CRM, such as the computer-executable programs to implement one or more modules in the system 200. Embodiments of a CRM include, but are not limited to, an electronic, optical, magnetic, or other storage or transmission device capable of providing a processor of the server with computer-readable instructions. Thus, examples of a suitable CRM include, but are not limited to, a floppy disk, CD-ROM, DVD, magnetic disk, memory chip, ROM, RAM, an ASIC, a configured processor, any optical medium, any magnetic tape or any other magnetic medium, or any other medium from which a computer processor is operable to read instructions.

Process

Figure 1:
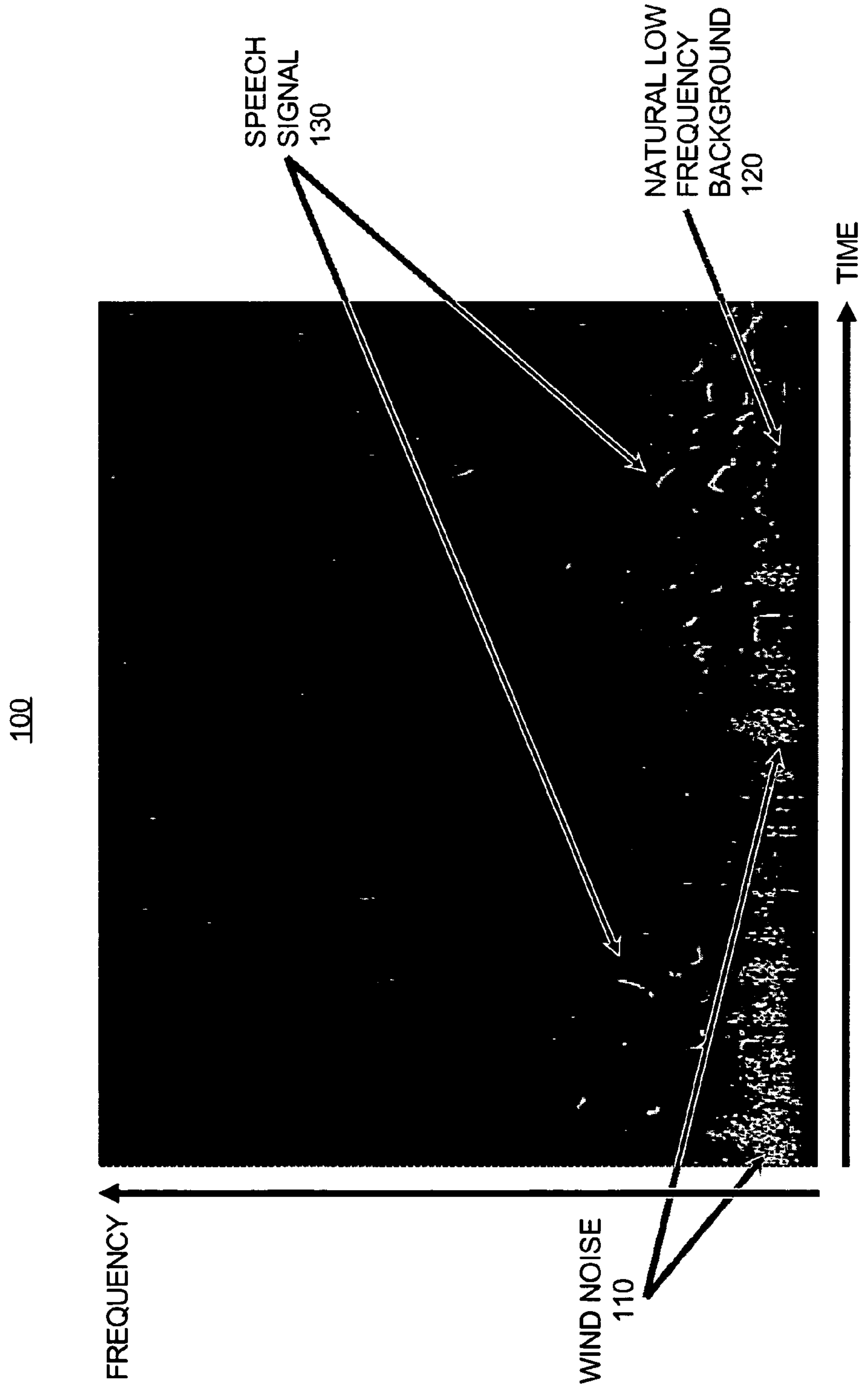
FIG. 1 illustrates a spectrogram 100 of a recording audio signal that contains wind noise, which one or more embodiments of the present invention may be employed to reduce or remove.

In accordance with various embodiments of the present invention, the various methods or processes for reducing audio noise in a recording audio signal are now described with reference to the process flows illustrated in FIGS. 3-4. For illustrative purposes only and not to be limiting thereof, these various process flows are discussed in the context of system 200 illustrated in FIG. 1.

Figure 3:
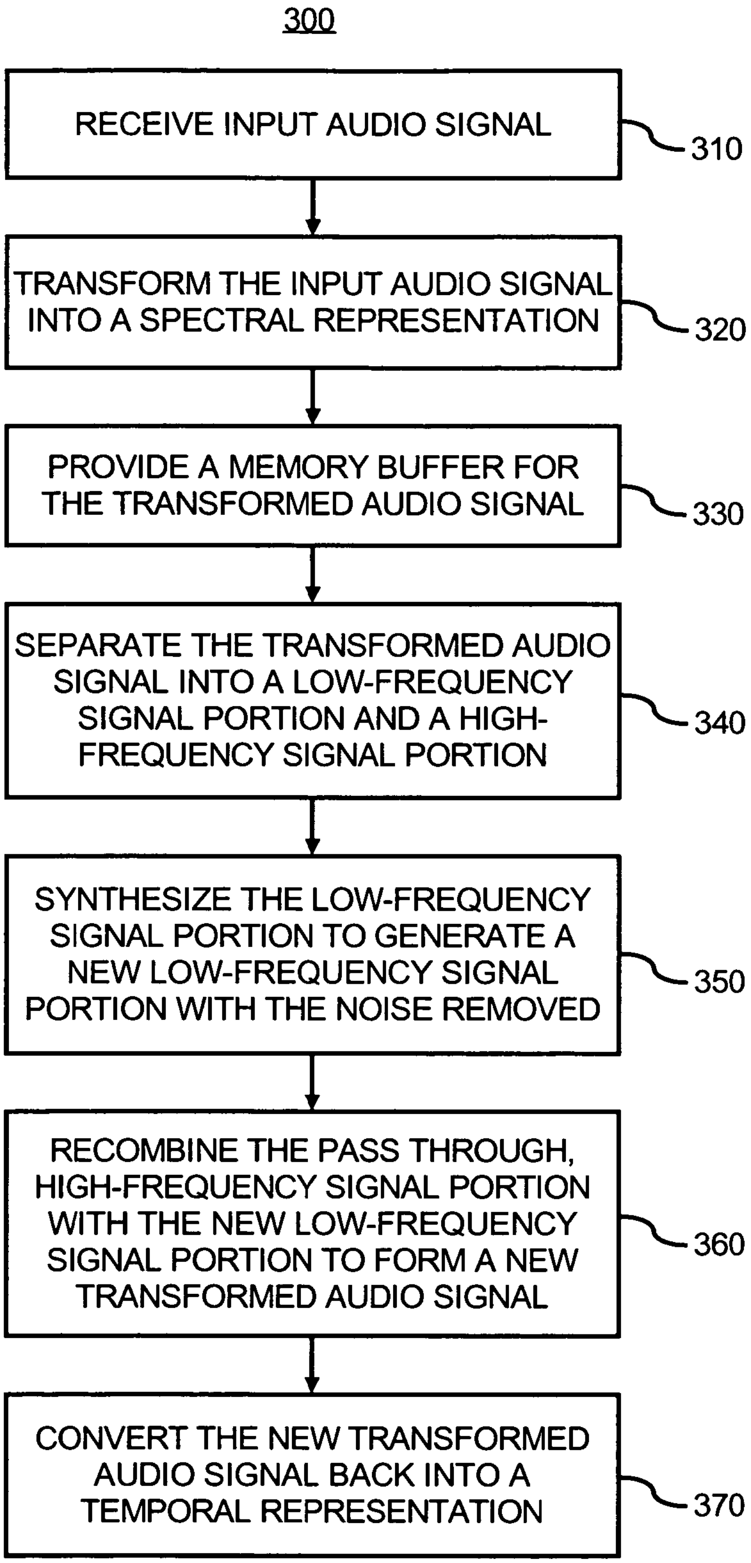
FIG. 3 illustrates a process flow for reducing noise in a recording audio signal, in accordance with one embodiment of the present invention.

FIG. 3 illustrates a process flow for reducing noise in a recording audio signal, in accordance with one embodiment of the present invention. At 310, an input audio signal 205 is received for recording or acquisition by a recording device. Examples of a recording device include but are not limited to a camcorder, a digital camera, a digital audio recorder, a digital audio and video recorder, or any other device capable of recording, or acquiring and storing, audio signals. In one embodiment, the recording device includes an audio noise reduction system therein, such as the system 200 shown in FIG. 2. Thus, the input audio signal 205 for recording by the recording device is received by the system 200 therein, at its time-to-frequency conversion module 210. The input audio signal 205 includes a desired intelligible component, such as speech or music, and an unintelligible component, such as rivers, waterfalls, or other background sound that is also desired. In addition, the input audio signal 205 may include noise contamination from unwanted or undesired audio noise, such as wind noise. Thus, the input audio signal 205 may be represented by the following equation in its natural time domain:

$$x(t)=s(t)+\eta(t)=s_I(t)+s_U(t)+\eta(t), \qquad \text{Equation 1}$$

where the input audio signal 205 is represented by x(t), which is the sum of the desired audio signal s(t) and the undesired audio noise $\eta$(t). The desired audio signal s(t) further includes two components, $s_I(t)$, the intelligible component, and $s_U(t)$, the unintelligible component.

At 320, the time-to-frequency module 210 digitizes or discretizes the input audio signal x(t) as desired and performs a short-time Fourier transform on the digitized input audio signal to transform its representation from the time domain to the frequency domain with spectral indexing to generate a spectrogram for spectral analysis. Thus, the input audio signal 205 is transformed into a spectral representation. Numerous programming algorithms or software packages are available to discretize or digitize analog signals and perform the short-time Fourier transform of the digital audio signal. Alternatively, instead of transforming an input analog audio signal, the time-to-frequency module 210 is operable to receive an input digital audio signal and performs the frequency transformation without the need to first digitize such an input signal. When the input audio signal 205 is transformed from the time domain to the frequency domain, it is represented by the following equation:

$$X(n,k)=S(n,k)+N(n,k)=S_I(n,k)+S_U(n,k)+N(n,k). \qquad \text{Equation 2}$$

Hence, the input audio signal x(t) is transformed to the discrete-time, short-time transform X(n,k) with time sample or index, k, and spectral index, n. $S_I$(n,k) represents the intelligible component, $S_U$(n, k) represents the unintelligible component, and N(n,k) represents the undesired noise.

At 330, in one embodiment, the transformed audio signal X(n,k) is forwarded to the spectrogram buffer module 220, which provides short-segment buffering for the transformed audio signal when non-real-time audio processing is desired. This is the case, for example, when the recording device is a digital versatile disc (DVD) camcorder that records audio/video signals to a DVD and requires or allows for latency in the recording process. In such a case, the spectrogram buffer module 220 provides a storage or memory buffer for short segments, one at a time, of the transformed audio signal X(n,k), as the input audio signal x(t) is transformed by the time-to-frequency conversion module 210. The length of the short-time segment may be predetermined so as to accommodate any latency desired by the recording device. In another embodiment, the system 200 is capable of real-time audio processing, whereby the input audio signal x(t), as transformed by the time-to-frequency conversion module 210 into X(n,k), is ready for further processing without the need for buffering in the spectrogram buffer module 220.

At 340, the spectrogram buffer module 220 separates the transformed audio signal X(n,k), or each buffered segment thereof, into two signal portions, a high-frequency signal portion, $X_{high}$(n,k), and a low-frequency signal portion, $X_{low}$(n,k). The high-frequency signal portion, $X_{high}$(n,k), is to include the intelligible component, or:

$$X_{high}(n,k)=S_I(n,k). \qquad \text{Equation 3}$$

The low-frequency signal portion, $X_{low}$(n,k), is to include the unintelligible component and any noise, or:

$$X_{low}(n,k)=S_U(n,k)+N(n,k). \qquad \text{Equation 4}$$

As mentioned earlier, the crossover or threshold frequency for separating the $X_{high}$(n,k) and $X_{low}$(n,k) signal portions may be predetermined. This is done based on, for example, past empirical data identifying the typical frequency range of the undesired noise in the input audio signal. For example, undesired noise such as wind noise is typically in the low-frequency range along with the unintelligible component of the input audio signal 205, with the high-frequency range occupied by the intelligible component of the input audio signal 205, as illustrated in Equations 3 and 4 above. Therefore, the threshold frequency may be set at a frequency which wind noise becomes negligible.

In an alternative embodiment, the threshold frequency is adaptively determined and set based on a signal analysis of the input audio signal 205. For example, the system 200 is operable to include a signal analysis module, which is either separate from or incorporated into the time-to-frequency conversion module 210 or the spectrogram buffer module 220. The signal analysis module is responsible for: a) receiving the transformed input audio signal X(n,k); b) calculating a short-time energy, $E(k_a)$, for each time sample or index $k_a \in [0 \ldots (k_1-1)]$ (each vertical time slice for a given $k_a$, where one can envision these vertical time slices by viewing FIG. 1); c) calculating the average energy for all the vertical time slices; d) identifying those vertical time slices that have unintelligible audio component with above-average energy levels; and e) determining the threshold frequency based on the low frequencies in the identified vertical time slices at which the unintelligible audio component with additional energy is found, wherein the additional energy is presumed to be energy from the noise.

There are instances in which the threshold frequency must be set high to accommodate the high-frequency characteristics of the undesired noise. Consequently, the resulting low frequency component $X_{low}(n,k)$ also may include the desired intelligible component, $S_I(n,k)$, of the input audio signal 205. Thus, additional procedures are needed to separate the intelligible and unintelligible components in the signal, $X_{low}(n,k)$. In one embodiment, this separation is performed based on a determination of the randomness (corresponding to the unintelligible component) of the signal $X_{low}(n,k)$ in the spectral domain as follows. First, if x and y are Normal random variables respectively corresponding to the real and imaginary components of a Fourier transform, their joint probability density function (PDF) is given by, $$f(x, y) = \frac{1}{2\pi\sigma^2} e^{-(x^2+y^2)/2\sigma^2}. \qquad \text{Equation 5}$$

Then, the magnitude, $r=\sqrt{x^2+y^2}$, has a Raleigh PDF given by, $$f(r) = \frac{r}{\sigma^2} e^{-r^2/2\sigma^2} u(r), \qquad \text{Equation 6}$$

where u(r) represents a unit step function, that is, u(r)=0 if r<0 and u(r) 1 if r≧0.

A control chart is derived for each spectrogram frequency slice (horizontal slice for each spectral index n), or frequency spectral band, of $X_{low}(n,k)$, with the Rayleigh distribution of Equation 6 used for the random variables in each horizontal frequency slice. A control chart is also derived corresponding to each such horizontal frequency slice of a predetermined random input noise, such as a white Gaussian random noise. The chart for $X_{low}(n,k)$ is compared with the control chart for each horizontal frequency slice, whereby the frequency slice is assumed part of the unintelligible component if its chart remains within the control limits set by the corresponding control chart. Such a frequency slice remains part of the signal $X_{low}(n,k)$ and is subjected to further synthesis as describe below. On the other hand, any frequency slice with its chart outside the control limits set by the corresponding control chart is considered part of the intelligible component and passed through without further synthesis.

It should be understood that the process flow 300 at 330 and 340 is interchangeable. In other words, the spectrogram buffer module 220 is operable to: a) buffer the transformed audio signal X(n,k) and then separate the buffered signal into separate frequency components as needed to continue the process flow 300, or b) separate the transformed audio signal X(n,k) into separate frequency components and then buffer such components until such components are needed to continue the process flow 300.

Referring back to FIG. 3, the process flow 300 continues at 350, where the synthesizer 230 modifies or synthesizes the separated low-frequency signal portion, $X_{low}(n,k)$, through signal synthesis, to generate a new low-frequency signal portion, $X_{low}^{new}(n,k)$ with the noise removed or reduced, as further described below with reference to FIG. 4.

At 360, the new low-frequency signal portion, $X_{low}^{new}(n, k)$, is recombined with the pass-through, high-frequency signal portion, $X_{high}(n, k)$, by the frequency combiner 240, to derive a new transformed audio signal, $X^{new}(n, k)$.

At 370, the new transformed audio signal, $X^{new}(n,k)$, is transformed back into the time domain, i.e., a temporal representation, $X^{new}(t)$, using the inverse short-time Fourier transform and the phase of the input audio signal 205, by the frequency-to-time conversion module 250 as output audio signal 255 for storage in a storage medium of the recording device or output for any desired purpose.

According to one embodiment, the system 200 or the process flow 300 may be used in conjunction with mechanical screens to further reduce noise in an input audio signal 205.

Figure 4:
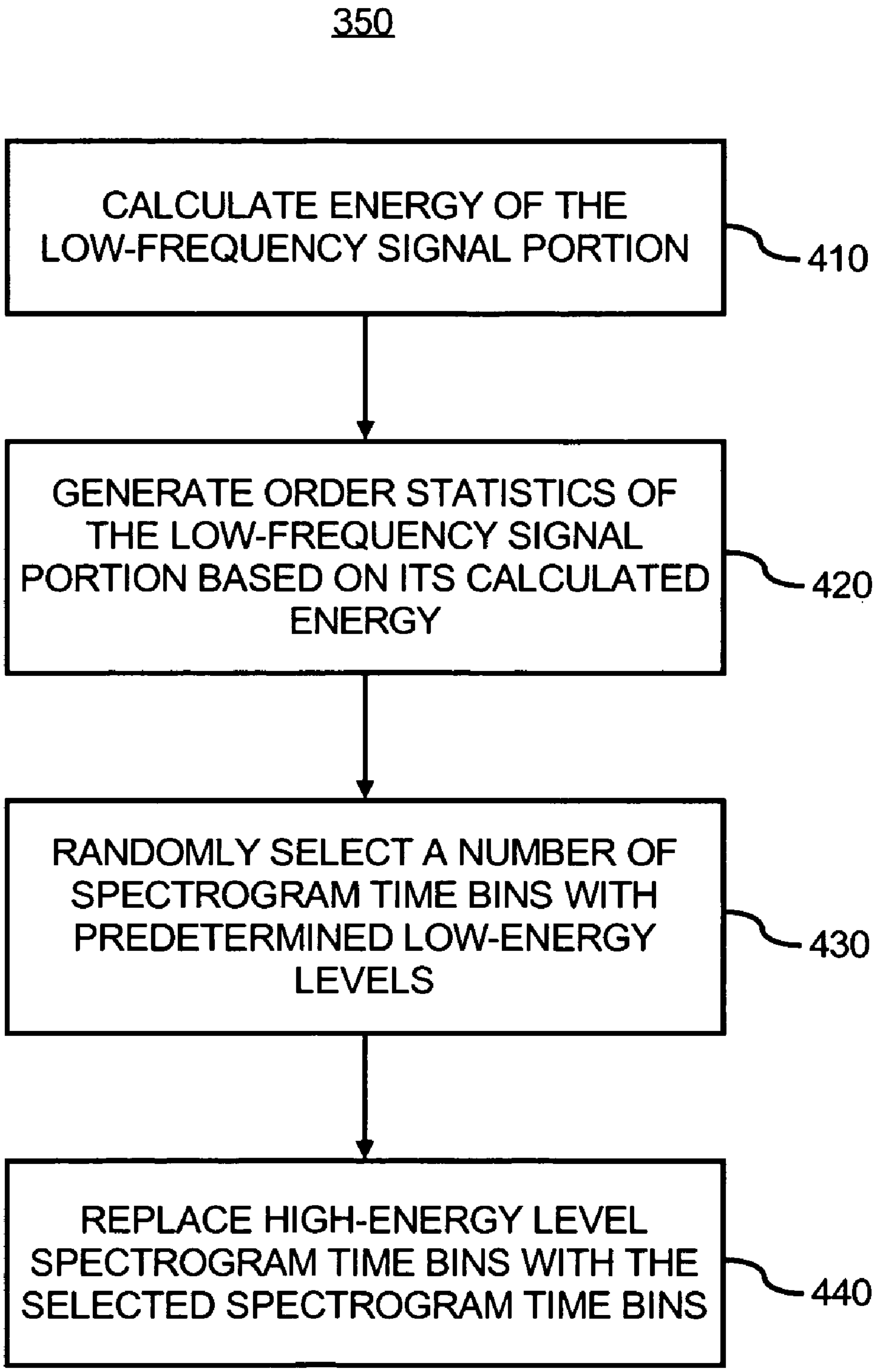
FIG. 4 illustrates a process flow for synthesizing an audio signal, in accordance with one embodiment of the present invention.

FIG. 4 illustrates the process flow 350 for synthesizing the audio texture of the low-frequency signal portion of X(n,k) to generate a new audio signal, in accordance with one embodiment of the present invention.

At 410, the short-time energy, $E(k_a)$, of the low-frequency signal portion, $X_{low}(n,k)$, is calculated for each time sample or index $k_a \in [0 \ldots (k_1-1)]$ by summing up the square amplitudes of the frequency bins of $X_{low}(n,k)$ at each time index $k_a$.

At 420, a spectrogram of the low-frequency signal portion, $X_{low}(n,k)$, is sorted in time based on the above energy calculation to generate the order statistics, with spectrogram time bins, $k_a \in [0 \ldots (k_1-1)]$, arranged in energy increasing or decreasing order in accordance with the energy level $E(k_a)$ calculated for each spectrogram time bin $k_a$. It has been found from past empirical data that the values of $E(k_a)$ may be separated into two levels: 1) the lower values of $E(k_a)$ occur when only the unintelligible portion, $S_U(n, k)$, is present in $X_{low}(n,k)$; and 2) the higher values of $E(k_a)$ occur when both the unintelligible portion, $S_U(n,k)$, and the undesired noise N(n,k) are present. The separation between the lower-values $E(k_a)$ (without noise) with predetermined low-energy levels and the higher-values $E(k_a)$ (with noise) with predetermined high-energy levels may be determined from past empirical data as well.

At 430, a pseudo-random number generator within the synthesizer 230 (or external thereto) is employed to randomly select a number of spectrogram time bins that have the predetermined low-energy levels, which are assumed to not have any energy associated with the undesired noise.

At 440, the selected spectrogram time bins are used by the synthesizer 230 to generate synthetic spectrogram time bins as replacements for those bins with high-energy levels. As with the threshold frequency, the high-energy level spectrogram time bins are chosen from past empirical data identifying the typical energy range of audio signals with undesired noise therein. The processed low-frequency signal portion, i.e., the new low-frequency signal portion, is now ready to be recombined with the pass-through high frequency component.

What has been described and illustrated herein are embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for reducing audio noise in an audio signal acquisition, comprising: receiving an input audio signal; separating the input audio signal into a high-frequency portion and a low frequency portion based on a threshold frequency; synthesizing the low-frequency portion to at least reduce any audio noise therein to generate a new low-frequency portion, wherein synthesizing the low-frequency portion comprises: computing an energy level for each of a plurality of segments of the low-frequency portion; separating the plurality of segments of the low-frequency portion into a high-energy level group and a low-energy level group based on the energy levels of the plurality of segments of the low-frequency portion; randomly selecting the energy level for one segment in the low-energy level replacing the energy levels of all the segments in the high-energy level group with the selected energy level to at least reduce any noise therein; combining the high-energy level group having the selected energy levels for the segments therein with the low-energy level group to generate the new low-frequency portion; combining the high-frequency portion and the new low-frequency portion to form a new audio signal representing the input audio signal; and outputting the new audio signal for the audio signal acquisition.

2. The method of claim 1, further comprising:
providing a memory buffer for the input audio signal upon receiving.

3. The method of claim 1, further comprising:
transforming the input audio signal into a spectral representation; and
transforming the new audio signal into a temporal representation prior to outputting.

4. The method of claim 1, further comprising:
selecting a predetermined threshold frequency as the threshold frequency for separating the input audio signal.

5. The method of claim 1, wherein separating the input audio signal comprises:
performing a signal analysis of the input audio signal to adaptively select the threshold frequency.

6. The method of claim 5, wherein performing the signal analysis of the input audio signal comprises:
dividing the input audio signal into a plurality of time segments;
computing an energy level of each of the plurality of time segments;
computing an average energy level of the plurality of energy levels of the plurality of time segments;
comparing the computed energy level of each of the plurality of time segments with the computed average energy level;
identifying at least one of the time segments as having the energy level above the computed average energy level; and
adaptively selecting the threshold frequency based on the at least one identified time segment.

7. The method of claim 1, further comprising:
maintaining the high-frequency portion, as initially formed from separating the input audio signal, for the combining with the new-low frequency portion.

8. The method of claim 7, wherein synthesizing the low-frequency portion comprises:
determining a randomness of each of a plurality of frequency bands in the low-frequency portion; and
synthesizing at least one of the plurality of frequency bands based on its determined randomness.

9. The method of claim 8, wherein determining the randomness of each of the plurality of frequency bands in the low-frequency portion comprises:
comparing randomness value of each of the plurality of frequency bands in the low-frequency portion with a predetermined threshold randomness value.

10. The method of claim 9, wherein synthesizing the low-frequency portion comprises:
maintaining without synthesizing at least one of the plurality of frequency bands having the randomness value above the threshold randomness value.

11. A system for reducing audio noise in a recording audio signal comprising: a first conversion module operable to receive and transform an input audio signal into a spectral representation; a signal separator module coupled to the first conversion module to receive and separate the transformed recording audio signal into a first portion having a first frequency range and a second portion having a second frequency range; a synthesizer module coupled to the signal separator module to receive the first portion with a noise signal and to synthesize the first portion to remove the noise signal, wherein synthesizing the low-frequency portion comprises:
computing an energy level for each of a plurality of segments of the low-frequency portion;
separating the plurality of segments of the low-frequency portion into a high-energy level group and a low-energy level group based on the energy levels of the plurality of segments of the low-frequency portion;
randomly selecting the energy level for one segment in the low-energy level group;
replacing the energy levels of all the segments in the high-energy level group with the selected energy level to at least reduce any noise therein; combining the high-energy level group having the selected energy levels for the segments therein with the low-energy level group to generate the new low-frequency portion; a frequency combiner module coupled to the signal separator module to receive the second portion and coupled to the synthesizer module to receive the synthesized first portion, the frequency combiner is operable to combine the second portion and the synthesized first portion into a new recording audio signal; and a second conversion module coupled to the frequency combiner module to convert the new recording audio signal from its spectral representation to its temporal representation.

12. The system of claim 11, wherein the first conversion module includes an analog-to-digital converter to digitize the input audio signal so as to transform the digitized input audio signal into a spectral representation.

13. The system of claim 11, wherein the system is a part of a recording device.

14. The system of claim 11, wherein the synthesizer module includes a pseudo-random number generator to assist with the synthesis of the first portion of the input audio signal.

15. The system of claim 11, wherein the signal separator module includes a memory buffer to maintain a segment of the transformed input audio signal for separation into the first portion and the second portion.

16. The system of claim 11, further comprising:

a signal analysis module operable to receive and perform a signal analysis of the transformed recording audio signal to generate a threshold frequency for use by the signal separator module to separate the transformed recording audio signal into the first portion and the second portion.

17. The system of claim 11, wherein the signal analysis module is a part of one of the first conversion module and the signal separator module.

18. A non-transitory computer readable medium on which is encoded program code for reducing audio noise in an audio signal acquisition, the encoded program code comprising: program code for receiving an input audio signal;

program code for separating the input audio signal into a high-frequency portion and a low-frequency portion based on a threshold frequency; synthesizing the low-frequency portion to at least reduce any audio noise therein to generate a new low-frequency portion, wherein synthesizing the low-frequency portion comprises: computing an energy level for each of a plurality of segments of the low-frequency portion; separating the plurality of segments of the low-frequency portion into a high-energy level group and a low-energy level group based on the energy levels of the plurality of segments of the low-frequency portion; randomly selecting the energy level for one segment in the low-energy level replacing the energy levels of all the segments in the high-energy level group with the selected energy level to at least reduce any noise therein; combining the high-energy level group having the selected energy levels for the segments therein with the low-energy level group to generate the new low-frequency portion; combining the high-frequency portion and the new low-frequency portion to form a new audio signal representing the input audio signal; and outputting the new audio signal for the audio signal acquisition.

19. The non-transitory computer-readable medium of claim 18, further comprising:

program code for providing a memory buffer for the input audio signal upon receiving.

* * * * *

UNITED STATES PATENT AND TRADEMARK OFFICE

CERTIFICATE OF CORRECTION

PATENT NO. : 8,005,239 B2
APPLICATION NO. : 11/589446
DATED : August 23, 2011
INVENTOR(S) : Ramin Samadani It is certified that error appears in the above-identified patent and that said Letters Patent is hereby corrected as shown below:

In column 7, line 28, in Claim 1, delete "level replacing" and insert -- level group; replacing --, therefor.

Signed and Sealed this
Tenth Day of April, 2012

David J. Kappos

*Director of the United States Patent and Trademark Office*